(12) United States Patent
Zerfass et al.

(10) Patent No.: US 6,343,795 B1
(45) Date of Patent: Feb. 5, 2002

(54) FLAT GASKET

(75) Inventors: Hans-Rainer Zerfass, Taunusstein; Thomas Anhorn, Dettingen; Peter Schenk, Hohenstein; Matthias Baur, Römerstein; Armin Diez, Lenningen; Victor Winkovic, Idstein, all of (DE)

(73) Assignee: ElringKlinger AG (DE)

( * ) Notice: Subject to any disclaimer, the term of this patent is extended or adjusted under 35 U.S.C. 154(b) by 0 days.

(21) Appl. No.: 09/468,150

(22) Filed: Dec. 21, 1999

(30) Foreign Application Priority Data

Aug. 23, 1999 (DE) .......................................... 199 39 869

(51) Int. Cl.$^7$ ............................................... F16J 15/08
(52) U.S. Cl. ......................... 277/593; 277/594; 277/596
(58) Field of Search ............................... 277/591, 593, 277/594, 595, 596

(56) References Cited

U.S. PATENT DOCUMENTS

| 3,930,656 A | * | 1/1976 | Jelinek .................... 277/593 |
| 4,140,323 A |   | 2/1979 | Jacobs |
| 4,397,472 A |   | 8/1983 | Czernik |
| 4,830,698 A | * | 5/1989 | Decore et al. ............. 277/593 |
| 5,322,299 A | * | 6/1994 | Terai ........................ 277/591 |
| 5,472,217 A |   | 12/1995 | Hagiwara et al. |
| 5,938,246 A | * | 8/1999 | Walllace et al. ........... 277/594 |
| 6,145,847 A | * | 11/2000 | Maeda et al. ............. 277/593 |

FOREIGN PATENT DOCUMENTS

| DE | 819177 | 7/1949 |
| DE | 1600560 | 9/1973 |
| DE | 2928954 | 1/1981 |
| DE | 2849018 C2 | 7/1982 |
| EP | 0866245 A2 | 9/1998 |
| JP | 09229196 A | 8/1997 |
| JP | 10196792 A | 7/1998 |
| JP | 10292865 A | 11/1998 |

* cited by examiner

Primary Examiner—Anthony Knight
Assistant Examiner—Enoch Peavey
(74) Attorney, Agent, or Firm—Leydig, Voit & Mayer, Ltd.

(57) ABSTRACT

Flat gasket, in particular, cylinder head gasket with a gasket plate which has at least one aperture and at least one sheet-metal layer which is provided with a bead surrounding the aperture, as well as with a stopper device preventing any excessive bead deformation; so that the sheet-metal layer does not tear even during dynamic pressure loads on the bead in the bead area which accompany a considerable flattening of the bead, the recess formed by the bead is filled over at least a considerable part of its depth with an elastomeric material which has appreciable flow properties under pressure even at ambient temperature (21° C.), i.e. is plastically deformable to a not inconsiderable extent.

19 Claims, 3 Drawing Sheets

FLAT GASKET

Figure 1:
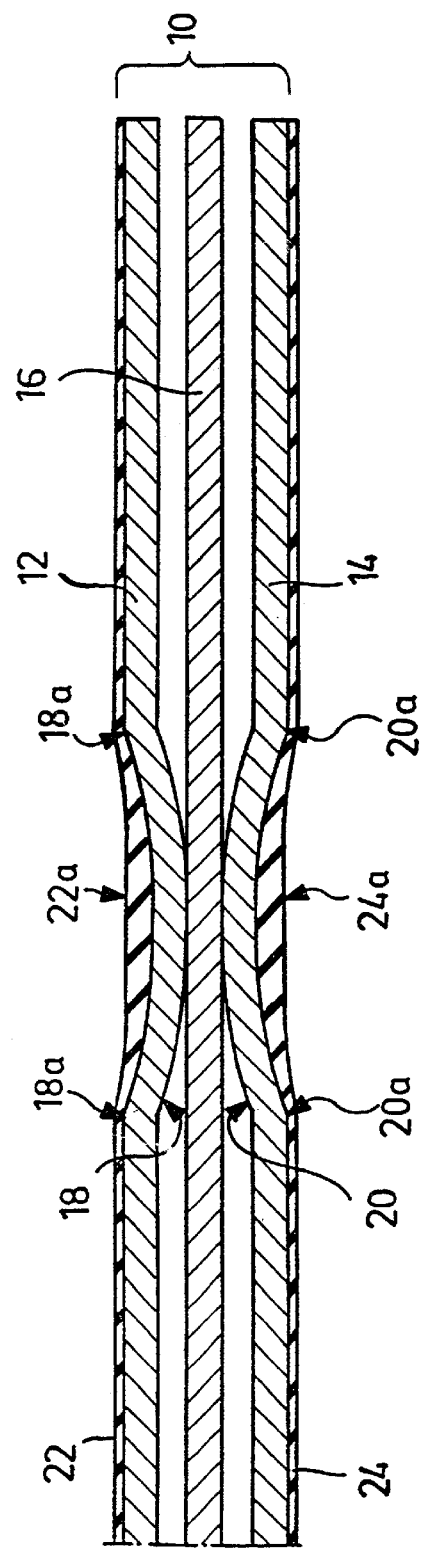

The invention relates to a flat gasket, in particular, a cylinder head gasket which has a gasket plate with at least one aperture and at least one sheet-metal layer which is provided with a bead surrounding the aperture as well as with a stopper device which prevents any excessive bead deformation and consists at least substantially of an elastomeric material which is arranged in the recess formed by the bead and fills the recess at least over part of its depth.

In the case of flat gaskets, the gasket plate of which is formed by one or several sheet-metal layers placed one on top of the other, beads surrounding apertures in a sheet-metal layer having elastic properties (customarily consisting of spring steel sheet) serve to seal against gases or liquids in that such a bead is pressed resiliently against another sheet-metal layer of the gasket plate or against components which are to be sealed in relation to one another, such as engine block and cylinder head, with the bead ridge, on the one hand, and with the two, so-called bead feet, on the other hand. Particularly in the case of cylinder head gaskets there is the risk that cracks will form in the bead during the course of operation because the width of the sealing gap between engine block and cylinder head to be sealed by the cylinder head gasket alters continuously during operation of the engine and, consequently, such a bead is constantly stressed dynamically; in order to prevent such a bead from deforming to too great an extent, i.e. from being flattened, during installation of the seal and/or during operation, so-called stoppers or stopper devices are allocated to the bead and these consist, for example, of a sheet-metal ring adjacent to the bead and welded onto the beaded sheet-metal layer, the thickness of the sheet metal of this ring being considerably less than the height of the non-deformed, i.e. non-stressed bead — the stopper then prevents any excessive bead deformation and is intended to ensure that the bead is, during operation, always deformed and stressed in the elastic range.

Stopper devices of the type mentioned at the outset are, however, already known in the form of a rubber ring which is inserted into the recess formed by the bead and completely fills this recess (cf. FIG. 9 of DE-28 49 018-C); as a result of the rubber ring, the degree of bead flattening during the installation of the gasket is intended to be reduced, and polymeric material squeezed out of the bead during the installation of the gasket is intended to improve the micro-sealing (since rubber is an incompressible material and the bead is unavoidably flattened to some extent during the installation of the gasket, some of the material of the rubber ring will, in any case, be squeezed out of the bead during the installation of the gasket).

A similar stopper device is disclosed in EP-O 866 245-A (cf. in this case, e.g., FIGS. 3, 5, 6 and 8 to 13), wherein the stopper function is undertaken by a rigid or rather stiff ring arranged in the bead and consisting of a resin (annular rigid resin layer) which fills the recess formed by the bead over approximately half its depth.

In the case of cylinder head gaskets, it has, however, been shown that during operation of the engine bead ruptures attributable to a crack formation cannot permanently be prevented even with stopper devices of this type, provided that another, additional stopper device, e.g., in the form of the sheet-metal ring described above is not present—if, however, such an additional stopper device is used, filling of the bead with elastomeric material is superfluous. The cramped space conditions often found in modern engines for cylinder head gaskets make it seem, however, to be often advisable (or even make it imperative) to do without a stopper to be arranged next to the bead.

The object underlying the invention was therefore to improve a flat gasket of the type mentioned at the outset, as known, for example, from DE-28 49 018-C, such that the endurance strength of a bead can be considerably increased in relation to dynamic stresses at right angles to the plane of the gasket plate even when dispensing with an additional, different stopper device, namely also during the occurrence not only of very slight bead deformations (flattenings).

During their efforts to solve this object the inventors have established completely surprisingly that a complete or partial filling of the bead with an elastomeric material is successful when this displays under pressure and at operating temperatures (temperatures at least corresponding, however, to the ambient temperature) flow properties (capability of plastic deformation) which are considerably above those of completely cross-linked polymeric materials. In order to delimit the present invention in practice by means of a measurement of the material properties in relation to the known state of the art, the following definition of the material properties can, in particular, be used:

The elastomeric material should be plastically deformable under pressure at a temperature corresponding at least to the ambient temperature (21° C.) in such a manner that it has at least the following set-down behavior: With a vertical pressure load on a circular pressure-load area of a uniform, flat layer of the elastomeric material having an initial layer thickness of approximately 24 $\mu$m, wherein the pressure-load area has an outer diameter of 65.4 mm and an inner diameter of 64.6 mm and the pressure load is 40 N per mm$^2$ of the pressure-load area, the layer thickness of the elastomeric material in the pressure-load area at 21° C. after a pressure-load duration of approximately 0.5 hours is at the most only approximately 85%, preferably only approximately 83 to approximately 37%, of the initial layer thickness.

Tests on spring steel sheets, which are provided with a bead and the recess of which formed by the bead was completely filled in one case with an almost completely cross-linked elastomeric material and in the other case with an elastomeric material with a low degree of cross-linking, have surprisingly resulted in the bead being flattened, during a dynamic pressure load, i.e. a pressure loading of the bead with a pressure altering quickly with respect to time, as is the case for a cylinder head gasket during operation of the engine, to more than double the amount without tearing when the elastomeric material with a relatively low degree of cross-linking is used (in comparison with the elastomeric material which is cross-linked almost completely).

Preferably, the bead is a so-called full-bead with a cross-section similar to a flat U.

Elastomeric materials which are preferred for the inventive gasket have, under pressure, such flow properties that the layer thickness of the elastomeric material decreases rapidly with respect to time after pressure is applied and is scarcely reduced further after approximately 0.2 hours. Such preferred, elastomeric materials display, in particular, such a set-down behavior with respect to time that after a pressure-load duration of approximately 1 hour the layer thickness is at the most only approximately 80%, in particular only approximately 80% to approximately 35% of the initial layer thickness.

The invention has a particularly advantageous effect when the elastomeric material does not completely fill the recess of the bead when the bead is not yet compressed but only over such a part of its depth that when the gasket is installed but not yet dynamically pressure-loaded the recess formed by the bead flattened somewhat in accordance with the assembly forces which are always specifically predetermined is completely filled by the elastomeric material.

The elastomeric material can be applied to the beaded sheet-metal layer only in the bead area; embodiments are, however, preferred, with which the elastomeric filling of the bead is part of an at least partial coating of the sheet-metal layer which also extends on both sides of the bead; the sheet-metal layer can, therefore, also be completely coated with the elastomeric material, namely not only on that side, on which the recess formed by the bead is located, but also on both sides.

In the case of cylinder head gaskets having a partial or full-surface coating of the beaded sheet-metal layer on one or both sides, the average layer thickness outside the bead is customarily in the order of magnitude of 18 to 28 $\mu$m, in particular, from 20 to 25 $\mu$m and the depth of the non-pressure-loaded bead is in the order of magnitude of 100 to 300 $\mu$m, in particular, of approximately 150 $\mu$m. For such cases, such a layer thickness of the elastomeric material in the recess formed by the bead is recommended that in the recess the maximum layer thickness is in the order of magnitude of 35 to 70 $\mu$m, preferably from 50 to 60 $\mu$m. If a coating of the sheet-metal layer with the elastomeric material also extends over areas of the sheet-metal layer located on both sides of the bead, it is generally recommended to carry out the coating such that the maximum layer thickness of the elastomeric material in the recess formed by the bead is approximately 1.5 to 3 times the average layer thickness outside the bead, above all when the average layer thickness of the elastomeric material outside the bead is approximately 18 to 28 $\mu$m and preferably approximately 23 to 24 $\mu$m.

During the production of sheet-metal layers provided for flat gaskets and coated partially or over their full surface with an elastomeric material, a preliminary or precursor material is customarily processed which contains an evaporatable solvent and after its hardening forms the elastomeric coating material. Known application methods for this preliminary material are sprinkling, spraying or application with the aid of the screen printing method. Since the preliminary material applied is still relatively low-viscous prior to its hardening (expelling the solvent and complete or, in the case of the present invention, partial cross-linking as a result of temperature treatment), it is suggested for a simple and inexpensive process for the production of an inventive flat gasket that a preliminary material which forms the elastomeric material after completion of the gasket and contains an evaporatable solvent be applied to the sheet-metal layer such that the preliminary material fills the recess formed by the bead to a greater degree than the elastomeric material of the finished gasket, whereupon the solvent is evaporated; in this way, it is easy to achieve the fact that the elastomeric material does not completely fill the recess formed by the bead even when, as is, for example, the case with use of the screen printing method, the preliminary material first of all fills the bead recess completely. If the preliminary material is, for example, sprinkled or sprayed on, its relatively low viscosity first of all can, however, also be utilized to achieve a greater layer thickness in the bead recess; for this purpose, it is recommended that the process be configured such that the preliminary material is applied first of all with an approximately uniform layer thickness and the solvent is not evaporated until additional preliminary material has flowed from areas on both sides of the bead into the recess formed by it.

Figure 2:
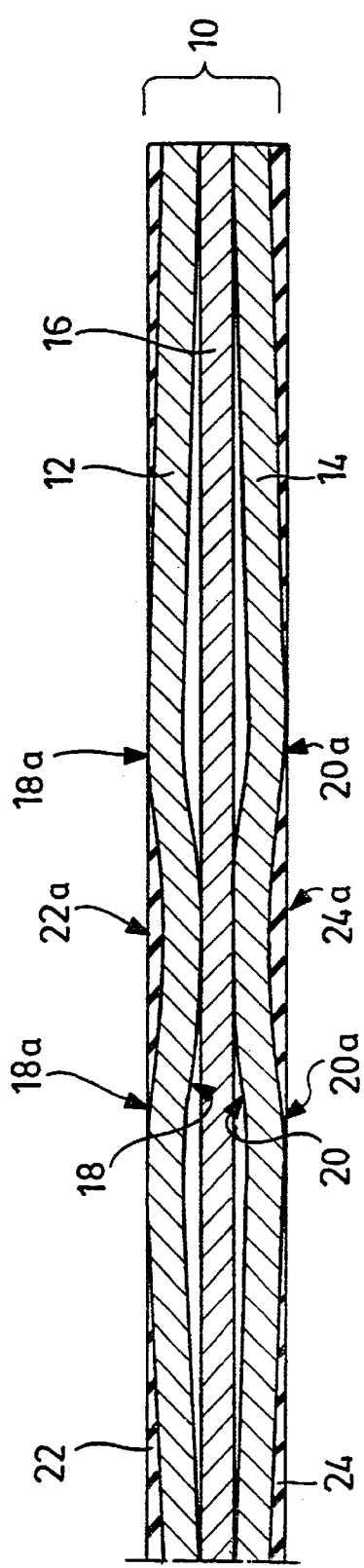
Figure 3:
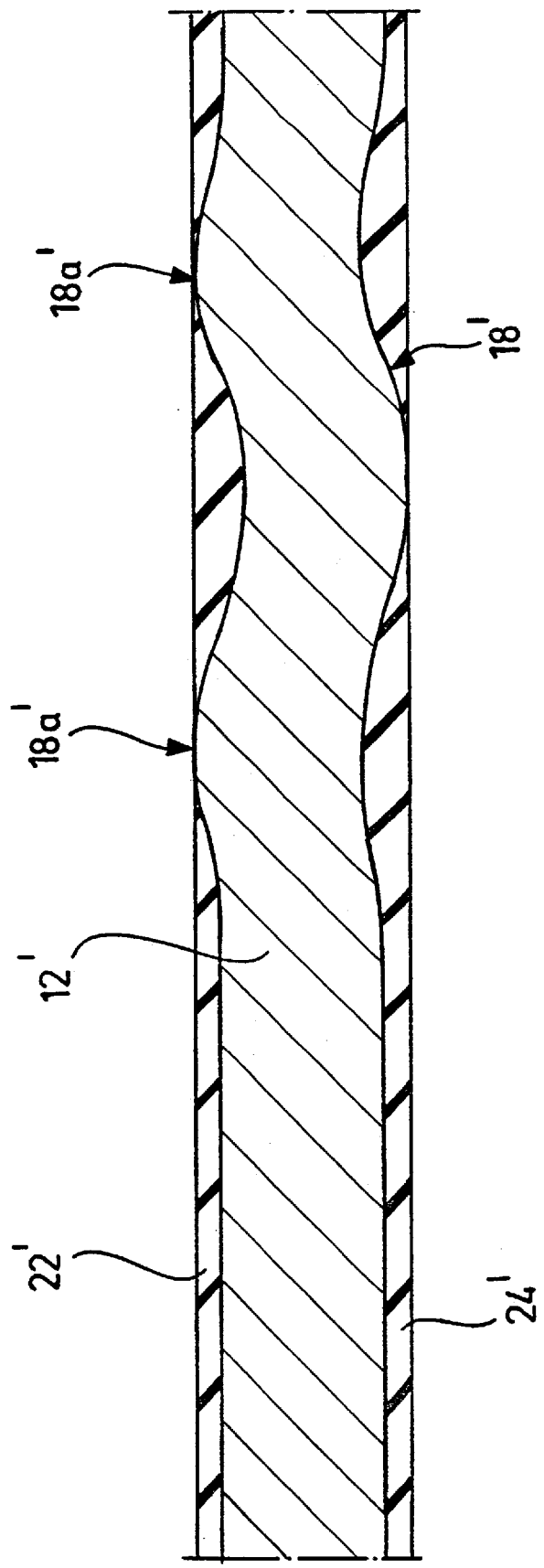
Figure 4:
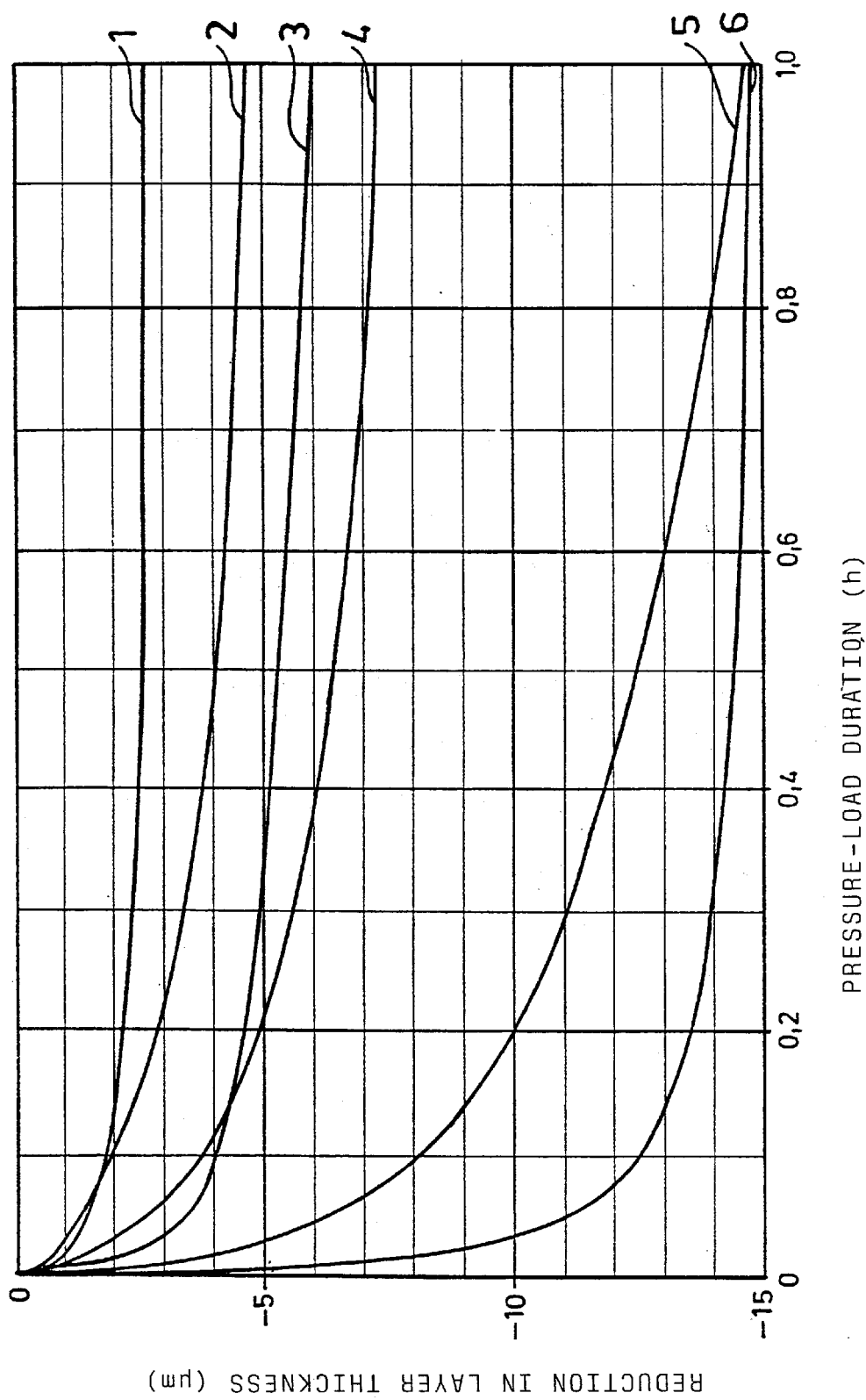

The invention will be explained in more detail in the following, namely on the basis of several examples as well as the attached drawings, in which the following is illustrated:

FIG. 1 a section through an area provided with beads of a multilayered gasket plate of an inventive gasket plate not yet installed, i.e. not yet pressure-loaded;

FIG. 2 the section illustrated in FIG. 1 but with an installed, i.e. compressed cylinder head gasket without this already being subjected to the variations in pressure occurring during operation of the engine;

FIG. 3 a considerably enlarged sectional illustration of an area provided with a bead of a sheet-metal layer of a flat gasket coated in accordance with the invention, and FIG. 4 a diagram which illustrates the set-down behavior (reduction with respect to time of the original layer thickness of the elastomeric material with a predetermined pressure load) of different elastomeric materials.

FIG. 1 shows in cross section an area of a gasket plate 10 of a cylinder head gasket prior to its installation, i.e. in a non-compressed state. This cylinder head gasket is a so-called metal layer gasket, the gasket plate of which has several sheet-metal layers placed one on top of the other, in the illustrated embodiment two outer sheet-metal layers 12 and 14 as well as an inner, central sheet-metal layer 16 —in the following, the layers 12 and 14 will be designated as outer layers and the layer 16 as inner layer. The two outer layers 12 and 14 are each provided with a so-called full bead 18 and 20, respectively, the cross section of which corresponds approximately to a flat U and which is intended to act as a sealing element; for this purpose, the outer layers 12 and 14 must have adequate, elastic properties, for which reason they consist, in particular, of spring steel sheet. The beads 18 and 20 are intended to surround an aperture of the gasket plate 10, which is not illustrated, annularly, e.g. a combustion chamber aperture of a cylinder head gasket.

On the outer sides of the outer layers 12 and 14 forming the two main surfaces of the gasket plate 10, these are provided with a coating 22 and 24, respectively, consisting of an elastomeric material, namely, in particular, over the entire surface in order to, for example, effect a microsealing at the sealing surfaces of cylinder head and engine block (sealing of pores and other irregularities of the sealing surfaces), and in order to prevent any excessive deformation (flattening) of the beads 18 and 20, which could lead to formation of cracks in the bead, during the installation of the gasket, above all, however, during operation of the engine, the beads are each provided with a stopper device, namely in accordance with the invention in the shape of an area 22a and 24a, respectively, of the coating 22 and 24 which has a substantially greater layer thickness than the areas of the coatings 22 and 24 located outside the beads. As is apparent in FIG. 1, the areas 22a and 24a do not, however, in accordance with the invention fill the recesses formed by the beads 18 and 20 such that completely flat main surfaces of the gasket plate 10 result but, rather, slight, quite flat hollows in the upper sides of the areas 22a and 24a.

Once the cylinder head gasket has been installed and the cylinder head screws tightened according to instructions, the state of the gasket plate 10 illustrated in FIG. 2 does, however, result, in which the two main surfaces of the gasket plate are at least almost completely flat, i.e. the elastomeric material then fills the recesses formed by the two somewhat flattened beads 18 and 20 completely, and since, in accordance with the invention, the elastomeric material is intended to have flow properties under pressure, the coating material in the area of the so-called bead feet 18a and 20a, respectively, flows away to the side at least to a great extent under the influence of the pressure forces exerted on the cylinder head gasket during its installation, as is apparent from FIG. 2.

In the finished cylinder head gasket, the elastomeric material of the coatings 22 and 24 is intended to have the settlement behavior described above under pressure, i.e. be adequately plastically deformable.

FIG. 3 shows a greatly enlarged cross section of an area provided with a bead of a spring steel sheet layer which is provided on both sides with a coating consisting of an elastomeric material with inventive properties and can form a one-layered flat gasket or one layer of a multilayered gasket. On the basis of FIGS. 1 and 2, the metal layer has been designated as 12', the coating as 22' and 24', the bead as 18' and the bead feet as 18a', wherein FIG. 3 is intended to illustrate that state which is reached some time after installation of the gasket but prior to any dynamic pressure load.

The diagram illustrated in FIG. 4 shows the typical settlement behavior of several, different elastomeric coating materials, wherein the reduction in the layer thickness, proceeding from the initial layer thickness of, for example, 24 μm, has been plotted as ordinate over the pressure-load duration as abscissa.

In FIG. 4, the set-down behavior of 6 different elastomeric materials has been illustrated, namely with the curves designated as (1) to (6). The curve (1) belongs to an elastomeric material without any appreciable flow properties (under pressure and at ambient temperature, 21° C.); this material is an elastomeric material which is cross-linked to a great extent. On the other hand, the curves (2) to (6) belong to elastomeric materials with inventive flow or set-down properties, wherein the flowability of the material belonging to curve (3) is greater than that of the material belonging to curve (2) etc., i.e. the material belonging to curve (6) flows the most under pressure.

As already mentioned, the curves illustrated in FIG. 4 have been plotted at ambient temperature (21° C.), namely using a hollow cylindrical pressure stamp with an outer diameter of 65.4 mm, an inner diameter of 64.6 mm and a flat end face which extends at right angles to the cylinder axis and has been pressed against an elastomeric coating of a flat sheet metal, namely with a cylinder axis extending at right angles to the plane of the sheet metal and such a pressure force that a time-constant specific pressure load on the coating of 40 Newtons per mm² results in the area of the end face of the pressure stamp shaped like a circular ring.

Tests with 6 different elastomeric materials which have a flow or set-down behavior as illustrated by the curves (1) to (6) in FIG. 4 have led to the results specified in the following; during these tests, spring steel sheets each provided with a bead were coated over their entire surface with the respective elastomeric material, wherein the initial layer thickness outside the beads was approximately 24 82 m, the maximum bead depth approximately 250 μm and the maximum layer thickness of the elastomeric material in the recess formed by the bead approximately 60 μm.

The bead was dynamically pressure-loaded each time, namely with pressures varying with respect to time and having a respectively different average magnitude, wherein that flattening of the bead, i.e. that extent of the reduction in the original bead h eight, was measured, at which the bead deformation leads to the occurrence of a crack in the bead.

Without any coating with elastomeric material, a reduction in the bead height by 2.5 μm already led to the formation of cracks.

With a coating with an elastomeric material having a flow behavior corresponding to the curve (1), a reduction in the bead height by 3 82 m led to the formation of cracks, i.e. such a material does not result in any appreciable improvement.

Coatings with a flow behavior corresponding to the curves (2) to (4) did, however, result in an abrupt improvement since crack formation did not result until the original bead height was reduced by 7 μm (material allocatable to the curve (2)) or 7.5 μm (materials allocatable to the curves (3) and (4)). In the following, two examples for the elastomeric material to be used in accordance with the invention are described:

EXAMPLE I

|  | phr |
|---|---|
| Fluorinated rubber (copolymer with 66% fluorine content) | 100.00 |
| Carbon black N990 | 15–45 |
| Magnesium oxide (low activity) | 5–15 |
| Bound diamine | 1–4 |

EXAMPLE II

|  | phr |
|---|---|
| Fluorinated rubber (quaternary polymer with 67% fluorine content) | 100.00 |
| Carbon black N990 | 10–40 |
| Zinc oxide | 2–6 |
| TAIC | 1–4 |
| Peroxide | 1–4 |

In these examples (as usual):
phr = per 100 parts rubber
TAIC = triallyl-sym-triazine-2,4,6-1H,3H,5H-trione The flow properties of the elastomeric material desired in accordance with the invention are thereby set independently of the formula by way of suitable cross-linking conditions, e.g. by way of a heat treatment at 180° C. to 260° C. for 1 to 3 minutes.

What is claimed is:

1. Flat gasket with a gasket plate having at least one aperture and at least one sheet-metal layer provided with a bead surrounding the aperture, as well as with a stopper device preventing any excessive bead deformation and consisting at least substantially of an elastomeric material arranged in the recess formed by the bead and filling said recess at least over part of its depth, characterized in that the elastomeric material is plastically deformable under pressure at a temperature of at least ambient temperature (21° C.) in such a manner that it has at least the following set-down behavior:

with a vertical pressure load on a circular annular pressure-load area of a uniform, flat layer of the elastomeric material having an initial average layer thickness of 24 μm, wherein the pressure-load area has an outer diameter of 65.4 mm and an inner diameter of 64.6 mm and the pressure load is 40 N per mm² of the pressure-load area, the layer thickness of the elastomeric material in the pressure-load area after a pressure-load duration of approximately 0.5 hours at 21° C. is at the most only approximately 85% of the initial layer thickness.

2. Flat gasket as defined in claim 1, characterized in that the set-down behavior of the elastomeric material is such that after a pressure-load duration of approximately 1 hour the layer thickness is at the most only approximately 80% of the initial layer thickness.

3. Flat gasket as defined in claim 1, characterized in that the set-down behavior of the elastomeric material is such that after a pressure-load duration of approximately 0.5 hours the layer thickness is only approximately 83% to approximately 37% of the initial layer thickness.

4. Flat gasket as defined in claim 1, characterized in that the set-down behavior of the elastomeric material is such that after a pressure-load duration of approximately 1 hour the layer thickness is only approximately 80% to approximately 35% of the initial layer thickness.

5. Flat gasket as defined in claim 1, characterized in that the elastomeric material fills the recess formed by the bead over such a part of its depth that with a gasket installed and a correspondingly flattened bead its recess is completely filled.

6. Flat gasket as defined in claim 1, characterized in that the elastomeric filling of the bead is part of an at least partial coating of the sheet-metal layer, said coating also extending on both sides of the bead.

7. Flat gasket as defined in claim 6, characterized in that the maximum layer thickness of the elastomeric material in the recess formed by the bead is approximately 1.5 to 3 times the average layer thickness outside the bead.

8. Flat gasket as defined in claim 6, characterized in that the average layer thickness of the elastomeric material outside the bead is approximately 18 to 28 $\mu$m.

9. Process for the production of a flat gasket as defined in claim 1, characterized in that a precursor material for forming the elastomeric material of the finished gasket and containing an evaporatable solvent is applied to the sheet-metal layer such that the precursor material fills the recess formed by the bead to a greater degree than the elastomeric material of the finished gasket, whereupon the solvent is evaporated.

10. Process as defined in claim 9, characterized in that the precursor material is applied by one of the following methods: sprinkling on, spraying on, roller application and application by the screen printing method.

11. Process as defined in claim 10, characterized in that the precursor material is applied with an approximately uniform layer thickness and the solvent is not evaporated until precursor material has flowed from areas on both sides of the bead into the recess formed by it.

12. A cylinder head gasket with a gasket plate having at least one aperture and at least one sheet-metal layer provided with a bead surrounding the aperture, as well as with a stopper device preventing any excessive bead deformation and consisting at least substantially of an elastomeric material arranged in the recess formed by the bead and filling said recess at least over part of its depth, characterized in that the elastomeric material is plastically deformable under pressure at a temperature of at least ambient temperature (21° C.) in such a manner that it has at least the following set-down behavior:

with a vertical pressure load on a circular annular pressure-load area of a uniform, flat layer of the elastomeric material having an initial average layer thickness of 24 $\mu$m, wherein the pressure-load area has an outer diameter of 65.4 mm and an inner diameter of 64.6 mm and the pressure load is 40 N per mm$^2$ of the pressure-load area, the layer thickness of the elastomeric material in the pressure-load area after a pressure-load duration of approximately 0.5 hours at 21° C. is at the most only approximately 85% of the initial layer thickness.

13. Cylinder head gasket as defined in claim 12, characterized in that the set-down behavior of the elastomeric material is such that after a pressure-load duration of approximately 1 hour the layer thickness is at the most only approximately 80% of the initial layer thickness.

14. Cylinder head gasket as defined in claim 12, characterized in that the set-down behavior of the elastomeric material is such that after a pressure-load duration of approximately 0.5 hours the layer thickness is only approximately 83% to approximately 37% of the initial layer thickness.

15. Cylinder head gasket as defined in claim 12, characterized in that the set-down behavior of the elastomeric material is such that after a pressure-load duration of approximately 1 hour the layer thickness is only approximately 80% to approximately 35% of the initial layer thickness.

16. Cylinder head gasket as defined in claim 12, characterized in that the elastomeric material fills the recess formed by the bead over such a part of its depth that with a gasket installed and a correspondingly flattened bead its recess is completely filled.

17. Cylinder head gasket as defined in claim 12, characterized in that the elastomeric filling of the bead is part of an at least partial coating of the sheet-metal layer, said coating also extending on both sides of the bead.

18. Cylinder head gasket as defined in claim 17, characterized in that the maximum layer thickness of the elastomeric material in the recess formed by the bead is approximately 1.5 to 3 times the average layer thickness outside the bead.

19. Cylinder head gasket as defined in claim 17, characterized in that the average layer thickness of the elastomeric material outside the bead is approximately 18 to 28 $\mu$m.

\* \* \* \* \*